United States Patent
Fossat et al.

(10) Patent No.: US 11,958,283 B2
(45) Date of Patent: *Apr. 16, 2024

(54) PANEL WITH A LAYERED STRUCTURE

(71) Applicant: Composite Research S.r.l., Pinerolo (IT)

(72) Inventors: Eugenio Fossat, Pinerolo (IT); Nicola Giulietti, Pinerolo (IT)

(73) Assignee: Composite Research S.r.l., Pinerolo (TO)

( * ) Notice: Subject to any disclaimer, the term of this patent is extended or adjusted under 35 U.S.C. 154(b) by 0 days.

This patent is subject to a terminal disclaimer.

(21) Appl. No.: 16/971,795

(22) PCT Filed: Feb. 20, 2019

(86) PCT No.: PCT/IB2019/051383
§ 371 (c)(1),
(2) Date: Aug. 21, 2020

(87) PCT Pub. No.: WO2019/162854
PCT Pub. Date: Aug. 29, 2019

(65) Prior Publication Data
US 2020/0391477 A1 Dec. 17, 2020

(30) Foreign Application Priority Data
Feb. 23, 2018 (IT) .......................... 102018000002998

(51) Int. Cl.
*B32B 5/24* (2006.01)
*B32B 3/12* (2006.01)
(Continued)

(52) U.S. Cl.
CPC ............... *B32B 5/245* (2013.01); *B32B 3/12* (2013.01); *B32B 3/30* (2013.01); *B32B 5/024* (2013.01);
(Continued)

(58) Field of Classification Search
CPC .................................. B32B 3/12; B32B 5/245
See application file for complete search history.

(56) References Cited

U.S. PATENT DOCUMENTS 6,855,393 B1 * 2/2005 Ayres ..................... B32B 15/08
428/116
10,583,638 B2 * 3/2020 Fossat ..................... B32B 27/34
(Continued)

FOREIGN PATENT DOCUMENTS

EP 2774753 A1 9/2014
WO 2016120785 A1 8/2016

OTHER PUBLICATIONS

Petras, A.; "Design of Sandwich Structures" Abstract of PhD Thesis presented at Cambridge University, 1998, p. iv-v.; https://core.ac.uk/download/pdf/1332963.pdf.*

(Continued)

*Primary Examiner* — Mark Ruthkosky
*Assistant Examiner* — Julia L Rummel
(74) *Attorney, Agent, or Firm* — RMCK Law Group PLC

(57) ABSTRACT

Described herein is a panel with a layered structure having: a first outer layer; an intermediate layer; a second outer layer; and an interface layer between the intermediate layer and the second outer layer, the interface layer being configured for enabling adhesion of the layers between which it is set, wherein the second outer layer is obtained as a fabric with continuous fibres that have a tensile modulus of elasticity higher than or equal to 40 GPa measured according to the ASTM C1557 standard.

14 Claims, 12 Drawing Sheets

(51) Int. Cl.
B32B 3/30 (2006.01)
B32B 5/02 (2006.01)
B32B 5/18 (2006.01)
B32B 7/12 (2006.01)

(52) U.S. Cl.
CPC ............... B32B 5/18 (2013.01); B32B 7/12 (2013.01); *B32B 2260/021* (2013.01); *B32B 2260/046* (2013.01); *B32B 2262/0253* (2013.01); *B32B 2262/106* (2013.01); *B32B 2307/54* (2013.01); *B32B 2307/546* (2013.01); *Y10T 428/236* (2015.01); *Y10T 428/24149* (2015.01); *Y10T 428/249953* (2015.04)

(56) References Cited

U.S. PATENT DOCUMENTS

| | | | | |
|---|---|---|---|---|
| 2003/0087079 A1* | 5/2003 | Okabe | ............... | B32B 27/32 428/304.4 |
| 2005/0126848 A1* | 6/2005 | Siavoshai | ............. | B60R 13/083 181/290 |
| 2007/0256379 A1* | 11/2007 | Edwards | ............... | B32B 21/047 52/309.9 |
| 2011/0045724 A1* | 2/2011 | Bahukudumbi | ........ | B32B 5/245 442/247 |
| 2012/0164902 A1* | 6/2012 | Wienke | ................ | B29C 43/006 442/181 |
| 2013/0030090 A1* | 1/2013 | Nakai | ................... | C08L 77/00 524/35 |
| 2017/0080678 A1* | 3/2017 | Bhatnagar | ............... | B32B 5/022 |
| 2017/0087798 A1* | 3/2017 | Dodworth | ................ | B32B 3/12 |

OTHER PUBLICATIONS

MS State, "Strength and Stiffness Characteristics", 2017, p. 1-7; Accessed at https://web.archive.org/web/20170420215934/https://www.ae.msstate.edu/vlsm/materials/strength_chars/.*

Topas Advanced Polymers, "Ethylene Vinyl Acetate", p. 1, 2017; Accessed at https://web.archive.org/web/20170420170424/https://omnexus.specialchem.com/selection-guide/ethylene-vinyl-acetate/properties-of-eva.*

ASTM, "ASTM D5323-19a Standard Practice for Determination of 2 %Secant Modulus for Polyethylene Geomembranes", 2019, p. 1-4; https://www.astm.org/Standards/D5323.htm.*

ASTM, "ASTM D7748/D7748M-14 Standard Test Method for Flexural Rigidity of Geogrids, Geotextiles and Related Products", 2014, p. 1-3; https://www.astm.org/DATABASE.CART/HISTORICAL/D7748D7748M-14.htm.*

Varna et al.; "A Study of Tensile Properties of Twill-Woven Fabrics", Textile Research Journal, 1971, p. 999-1001.*

Autodesk Inc., "Helius Composite Community: Different compressive & tensile moduli", 2017, p. 1-6; https://forums.autodesk.com/t5/helius-composite-ideas/different-compressive-amp-tensile-moduli/idi-p/5026496.*

International Search Report dated Apr. 15, 2019. 10 pages.

* cited by examiner

FIG. 5
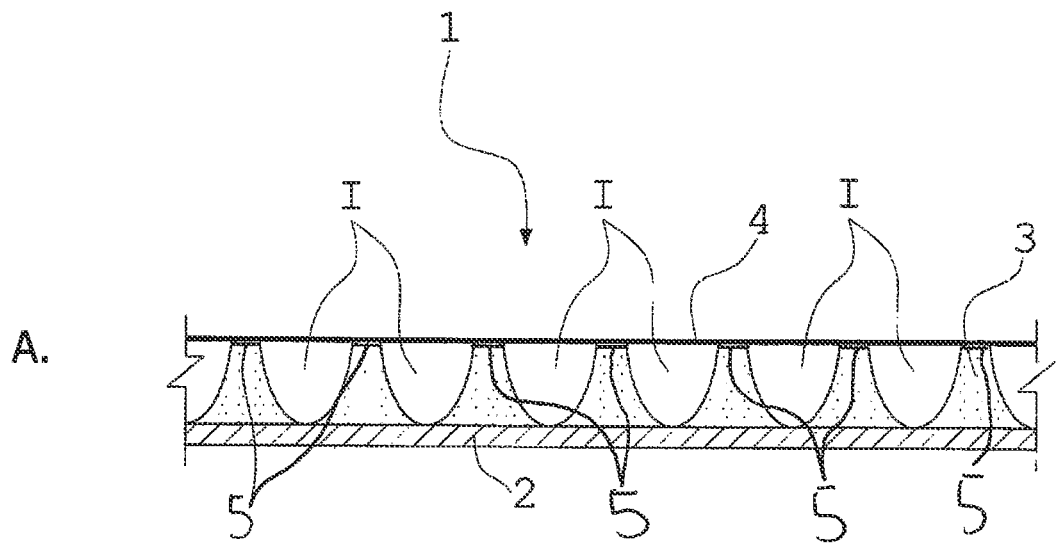
A.
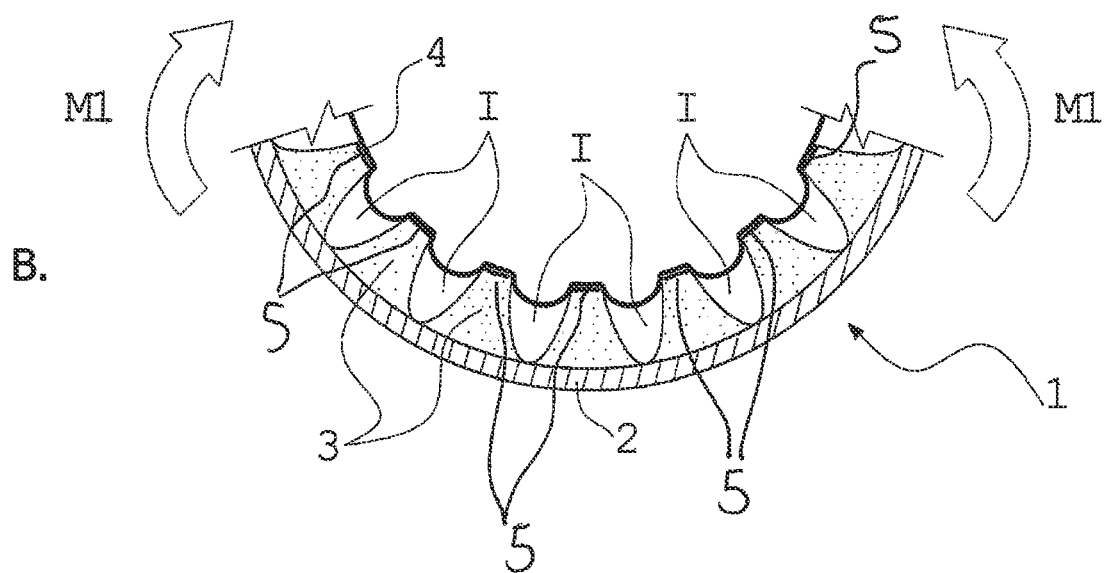
B.

FIG. 6
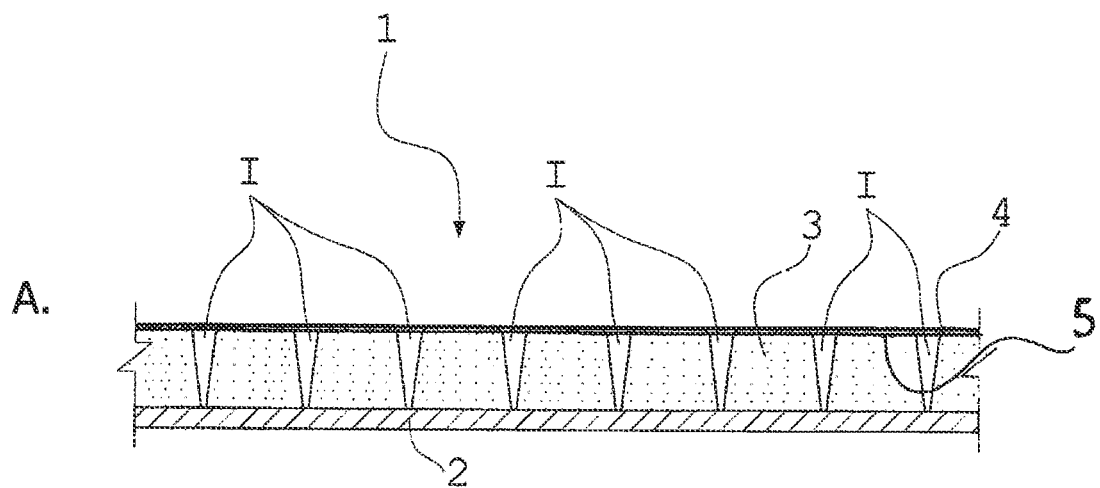
A.
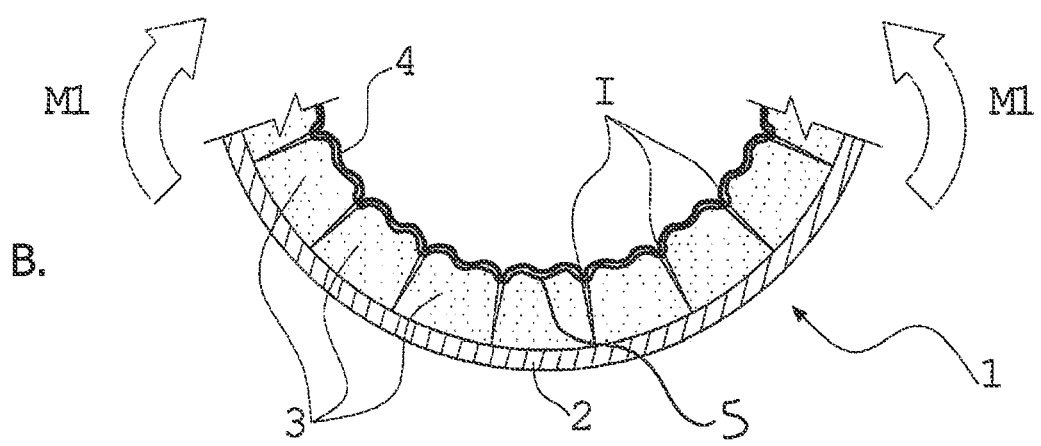
B.

FIG. 7
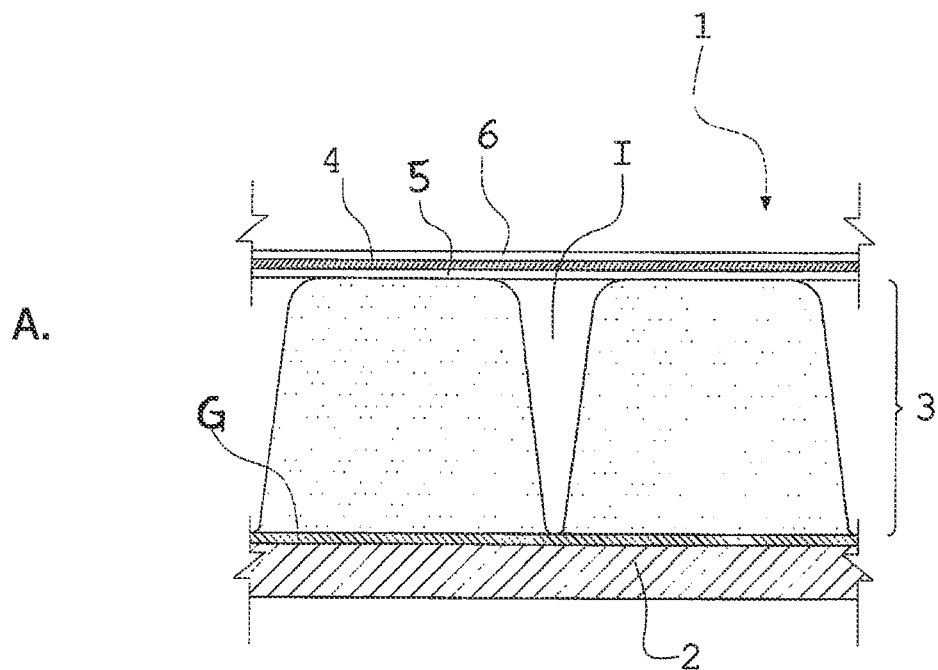
A.
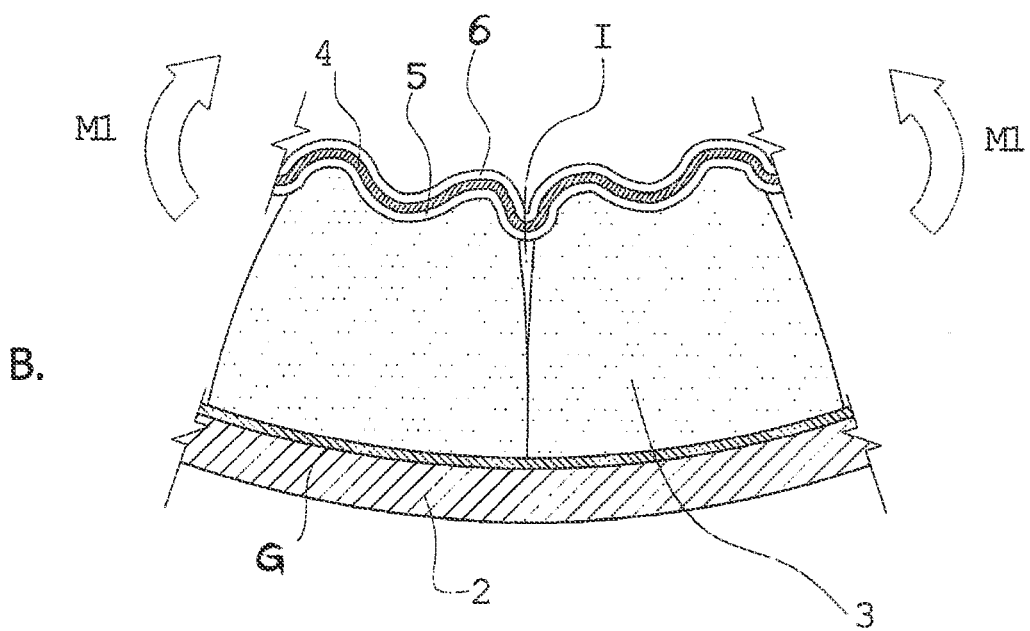
B.

FIG. 11
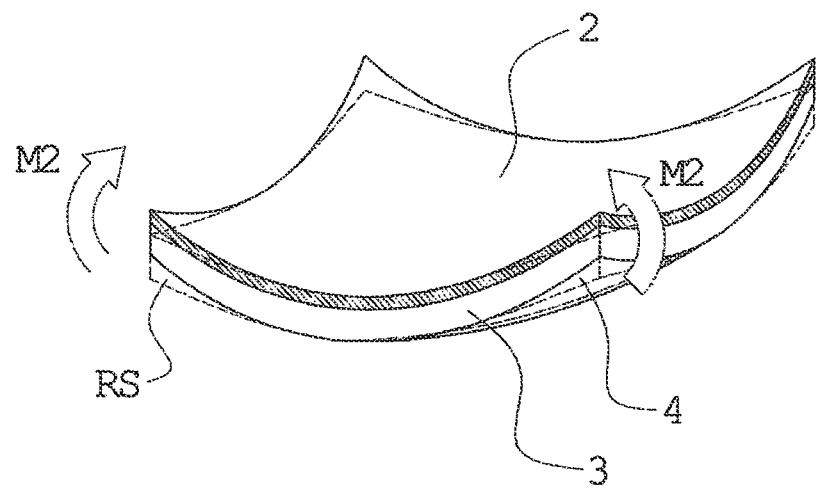
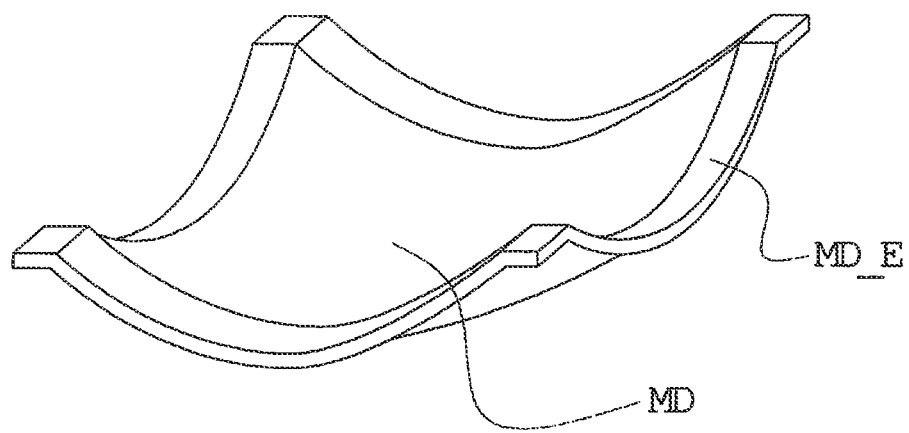

PANEL WITH A LAYERED STRUCTURE

CROSS-REFERENCE TO RELATED APPLICATIONS

This application is a 371 National Stage of International Application No. PCT/162019/051383, filed Feb. 20, 2019, which claims priority to Italian Patent Application No. 102018000002998 filed Feb. 23, 2018. The disclosure of each of the above applications is incorporated herein by reference in its entirety.

FIELD OF THE INVENTION

The present invention relates, in general, to the sector of panels having a layered structure, in particular a sandwich structure.

PRIOR ART

Known to the art are panels made up of composite material having a layered structure, and in particular having a so-called sandwich structure, which comprises, that is, two outer layers, referred to as "skins" or "faces", spaced apart from one another and connected by means of an intermediate layer, referred to as "core".

In general, the faces of these panels are constituted by "noble" materials and are designed for distribution of the loads in the plane. The intermediate layer, which has in general a greater thickness and is made of a lighter material than the faces, has the purpose of increasing the overall flexural rigidity of the panel at the cost of a slight increase in weight thereof.

Panels of this type hence have a static behaviour considerably better than that of the individual layers by which they are constituted. The present applicant has, however, noted—with reference to the panels that have a sandwich structure of a known type—that, when a bending moment is applied higher than a certain critical threshold, the face of the sandwich that undergoes compressive stress can suffer failure due to buckling and/or possible detachment of the face from the core.

Among panels having a layered structure panels are known that have the characteristic of being asymmetrical from the standpoint of flexural rigidity, i.e., panels with the capacity of withstanding the action of bending moments in a different way according to whether such moments tend to deflect the panels on one side or on the other.

An example of panel with layered structure having this characteristic is described in the document No. U.S. Pat. No. 4,286,006. The panel described, used in the packaging sector and constituted by a first outer layer, made, for example, of paper, of the type conventionally used for corrugated packaging materials, an intermediate corrugated layer, and a second outer layer, for example made of high-density polyethylene, having a high tensile strength but a low compression strength. The resulting panel is hence able to perform the function of bending on just one outer layer, in particular on the second outer layer.

The present applicant has, however, noted that the panel described can bend only in a direction parallel to crests and troughs of the corrugated layer, whereas it remains substantially rigid if an attempt is made to bend it in a direction perpendicular to the aforesaid crests and troughs.

A further example of panel with layered structure asymmetrical from the standpoint of flexural rigidity is described in the document No. EP 1074194. This panel, used for producing soles for footwear, is constituted by a first outer layer, which is flexible but substantially inextensible and is made, for example, of glass fibre, an intermediate layer constituted by a series of incompressible blocks, for example of solid foam, set in a transverse direction with respect to the panel, and a second outer elastic layer. The panel is hence able to bend only towards the first outer layer, owing to the fact that the blocks that make up the intermediate layer move away from one another and that the two outer layers have different mechanical properties.

The present applicant has, however, noted that the panel described presents non-optimal tensile mechanical properties, since the second outer layer, which is elastic, does not oppose a sufficient resistance to tensile forces applied in a longitudinal direction on the panel.

To overcome the technical problems referred to above, the present applicant has proposed a first solution forming the subject of the document No. WO 2016/120785 A1.

The panel forming the subject of WO 2016/120785 A1 exhibits an asymmetrical flexural rigidity according to the direction of deflection. In a first direction of deflection, with respect to the resting condition, the elastica of the panel corresponds to a situation in which the outer fibres of one of the outer layers are subjected to an action that, considered in itself (i.e., in a way divorced from other actions possibly superposed thereon that can act on the aforesaid fibres, including a pre-shaping of the material that imposes preliminarily fields of tensile or compressive strains) induces a tensile stress on the outer fibres themselves, whereas the outer fibres of the other outer layer are subjected to an action that, considered in itself (see above), induces a compressive stress on the outer fibres themselves (the term "outer fibres" is here used with the meaning borrowed from the field of structural mechanics, and does not allude to the structure of the material of which the layers are made).

In a second direction of deflection, with respect to the resting condition, the elastica of the panel corresponds to a situation specular to the one referred to above; namely, the outer fibres of the first layer are subjected to an action that, considered in itself (see above), induces a compressive stress on the outer fibres themselves, whereas the outer fibres of the second layer are subjected to an action that, considered in itself (see above), induces a tensile stress on the outer fibres themselves. However, given the same intensity of the bending moments, in the second direction of deflection the degree of deformation associated to the compressive and tensile stresses on the outer fibres of the outer layers is much lower than the degree of the same phenomenon in the first direction of deflection. It is possible to represent schematically this behaviour by associating two values of flexural rigidity to the panel, in particular a lower value of flexural rigidity, which is experienced when the panel is subjected to deformation in the first direction of deflection, and a higher value of flexural rigidity, which is experienced when the panel is subjected to deformation in the second direction of deflection.

Even though the panels obtained according to WO 2016/120785 A1 provide a response to all the technical problems referred to above, the present applicant notes how, for certain applications, the performance in terms of higher flexural rigidity may not meet the targets of performance required, proving in certain cases not to be optimal.

OBJECT OF THE INVENTION

The object of the present invention is to overcome the technical problems highlighted above. In particular, the object of the invention is to improve further the values of higher flexural rigidity of the panel.

SUMMARY OF THE INVENTION

The object of the present invention is achieved by a panel having the characteristics forming the subject of one or more of the annexed claims, which constitute an integral part of the technical teaching provided herein in relation to the invention.

In particular, the object of the present invention is achieved by a panel with layered structure comprising:
- a first outer layer;
- an intermediate layer;
- a second outer layer; and
- an interface layer between said intermediate layer and said second outer layer, said interface layer being configured for enabling adhesion of the layers between which it is set, wherein:
the second outer layer is obtained as a fabric with continuous fibres that have a tensile modulus of elasticity higher than or equal to 40 GPa measured according to the ASTM C1557 standard.

BRIEF DESCRIPTION OF DRAWINGS

The invention will now be described with reference to the annexed drawings, which are provided purely by way of non-limiting example and in which:

FIG. 4A is a schematic top plan view of the areas of contact between an interface layer and a second layer of the panel according to the invention obtained with a fabric having a weave of a twill type, whereas

FIG. 5 is divided into two parts, the first one of which, A, illustrates an embodiment of the panel according to the invention in an undeformed condition, and the second one of which, B, illustrates the same embodiment of the panel according to the invention in a deformed condition;

FIG. 6 is divided into two parts, the first one of which, A, illustrates a further embodiment of the panel according to the invention in an undeformed condition, and the second one of which, B, illustrates the same embodiment of the panel according to the invention in a deformed condition;

FIG. 7 is divided into two parts, the first one of which, A, illustrates yet a further embodiment of the panel according to the invention in an undeformed condition, and the second one of which, B, illustrates the same embodiment of the panel according to the invention in a deformed condition;

FIG. 11 illustrates in axonometric view an embodiment of the panel according to the present invention subjected to a bending moment and the forming die used to bestow thereon a shape at rest at the moment of production;

DETAILED DESCRIPTION OF EMBODIMENTS OF THE INVENTION

Figure 1:
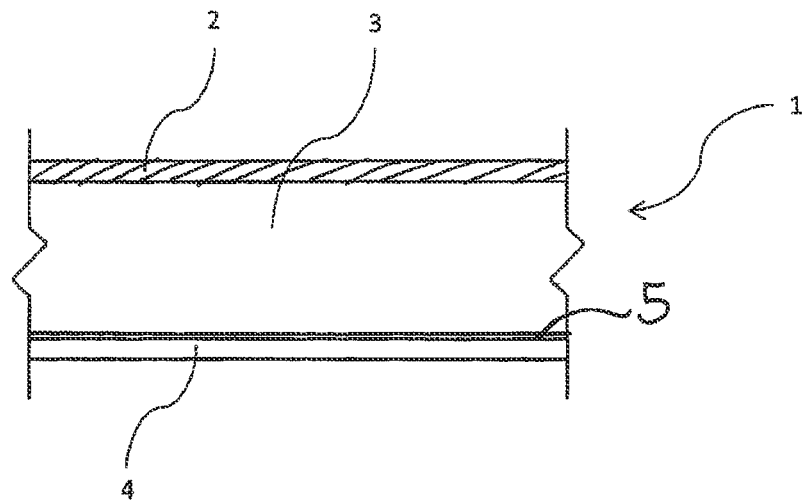
FIG. 1 is a cross-sectional view of a panel according to various embodiments of the invention, in resting conditions.

With reference to FIG. 1, the reference number 1 designates as a whole a panel according to various embodiments of the invention.

The panel 1 comprises a layered structure (the so-called sandwich structure) and comprises a first outer layer 2, an intermediate layer 3, and a second outer layer 4. These layers are at least partially joined together.

The outer layers 2, 4 are commonly referred to as "skins", whereas the intermediate layer 3 is commonly referred to as "core".

According to the invention, the structure of the individual layers of the panel 1 presents the characteristics described below.

The first outer layer 2 is made of sheet material, preferably composite material, having a flexural elasticity modulus higher than 2 GPa measured according to the ASTM E855 standard or ASTM D790 standard (depending upon the material); the thickness of the layer 2 is preferably comprised between 0.04 mm and 2.5 mm. The reference testing temperature prescribed by the standard is 23° C.±2° C. (room temperature). In general, in the case where in the present description no particular reference/testing temperature is specified, and/or in the case where it is specified that the reference/testing temperature is room temperature, the temperature in question is always understood as being equal to the value referred to above of 23° C.±2° C.

The second outer layer 4 comprises a fabric of continuous fibres with a tensile modulus of elasticity of at least 40 GPa (referred to the fibres) according to the ASTM C1557 standard. The fabric constituting the layer 4 may be either a single-fibre fabric, i.e., a fabric which presents just one type of fibre, or else a multi-fibre fabric, which is hence made up of fibres of different materials combined together in one fabric. The thickness of the layer 4 is preferably between 0.1 mm and 4 mm, more preferably between 0.15 mm and 1 mm. It should be noted that, according to the invention, the outer layer 4 is obtained as fabric proper, without any matrix. In other words, it does not consist of a composite material with fibre-reinforced matrix, since the continuous fibres of the layer 4 are not embedded in a matrix.

The intermediate layer 3 preferably has a thickness of between 1.5 mm and 30 mm, and has the function of increasing the flexural moment of inertia of the panel 1. Once again preferably, the thickness of the intermediate layer 3 is greater than the thickness of each of the outer layers 2 and 4.

The density of the intermediate layer 3 is moreover lower (preferably less than one quarter) than that of the materials constituting the layers 2 and 4.

Moreover provided between the outer layer 4 and the intermediate layer 3 is an interface layer 5, which provides the join between the outer layer 4 and the intermediate layer 3. The interface layer 5 comprises a polymeric film (preferably, a thermoplastic film), with a secant elastic modulus at 10% nominal strain of less than or equal to 350 MPa measured according to the ASTM D882 standard.

The interface layer 5 is set between the outer layer 4 and the intermediate layer 3, and during the process of manufacture of the panel 1 penetrates into the two adjacent layers (4 and 3) to bring about adhesion (gluing) thereof. Basically, the layer 5 operates as a precursor of adhesion between the layers 3 and 4, penetrating in each of them just for the depth necessary to obtain adhesion thereof. In this sense, it should be noted that the layer 5 does not perform the functions of a matrix for the outer layer 4, which remains in itself constituted by a fabric of continuous fibres, only minimally infiltrated on one side by the material of the layer 5, without this assuming the characteristics of a matrix.

Optionally, and preferably for certain applications, a further thermoplastic polymeric film 6 (FIGS. 7A and 7B), with a secant elastic modulus at 10% nominal strain of less than or equal to 350 MPa measured according to the ASTM D882 standard is provided as outer cladding of the layer 4, or else—like the layer 5—as precursor of adhesion between the layer 4 and a possible outer cladding layer having a protective, waterproofing, or aesthetic function. In preferred embodiments, the interface layer 5 and the cladding layer 6 are obtained in an identical way, being made of the same material and/or having the same mechanical properties (c.f. the secant elastic modulus referred to above).

Adhesion between the outer layer 2 and the intermediate layer 3 is instead obtained by means of a conventional adhesive, for example, a polyurethane-based glue, or else by means of local fusion between the material of the layer 3 and the material of the matrix of the layer 2 (if the latter is obtained as composite material with polymer matrix), or else by (thermo)chemical adhesion between the material of the layer 4 and the layer 2 (for example, in the case where the latter is made of metal material or a composite material with metal matrix).

Materials and Methods—1. Outer Layer 4

The outer layer 4 according to the invention obtained as a flexible skin of "dry" fabric (without matrix, except for penetration of the layer 5) of continuous fibres with high modulus, preferably ultra-high molecular weight polyethylene (UHMWPE), carbon, aramid fibre, PBO and other fibres with a tensile modulus of elasticity of at least 40 GPa according to the ASTM C1557 standard or hybrid fabrics constituted by combinations of these materials, more preferably constituted by fibres with a tensile modulus of elasticity higher than 80 GPa and even more preferably constituted by UHMWPE (commercially known by the trade name Dyneema®), and carbon, or aramidic fibre. As mentioned previously, the layer 4 has a thickness of between 0.1 mm and 4 mm, more preferably between 0.15 mm and 1 mm.

Alternatively, it is possible to use for the layer 4 high-density polyethylene fibres with a degree of crystallinity higher than 80% (defined as high-density polyethylene or HDPE).

Figure 1A:
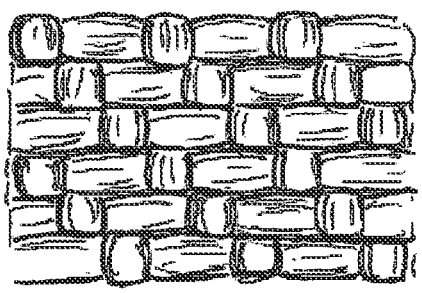
FIGS. 1A, 1B, and 1C illustrate three examples of fabric reinforcements, some of which can be used in a panel according to the invention.
Figure 1B:
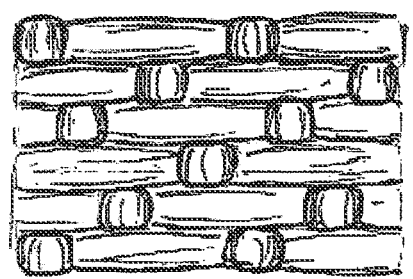

The fabric is preferably obtained with a textile weave of a twill type (FIG. 1A) with a titre of the yarn higher than 400 den or else of a satin type (FIG. 1B) with a titre of the yarn higher than 200 den. In this way, the number of weaves between warp and weft per unit area is reduced, and the curvature of the fibres is reduced, thus obtaining a fabric that is sufficiently rigid when subjected to tensile force.

Figure 1C:
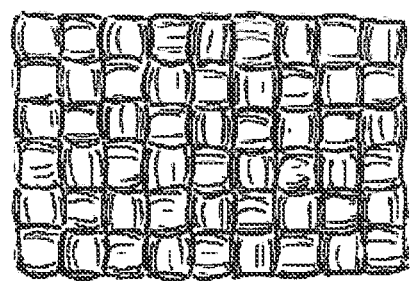

If, instead, the fibres present a high curvature at rest, as is the case, for example, of fabrics of a "plain" type (FIG. 1C) with a yarn having a titre of less than 200 den, when the fabric is subjected to a tensile stress, it tends to undergo considerable deformation (even when it is constituted by high-modulus fibres) on account of the strain of the threads subjected to the load, which tend to align with the direction of the tensile force.

By reducing the number of weaves between the fibres, a reduction is at the same time obtained in the reversible buckling stress of the weaves and of the fibres that make them make up, thus facilitating bending of the panel in the first direction of deflection. Moreover, the greater length available between one weave and the next, together with the high titre of the yarn, enables increase of the radius of curvature of the fibres during the phenomenon of reversible buckling, thus reducing the stresses within the fibres and between the fibres and the adhesive, with consequent lengthening of the useful service life of the panel and increase in the number of bending cycles that this can withstand.

Figure 4A:
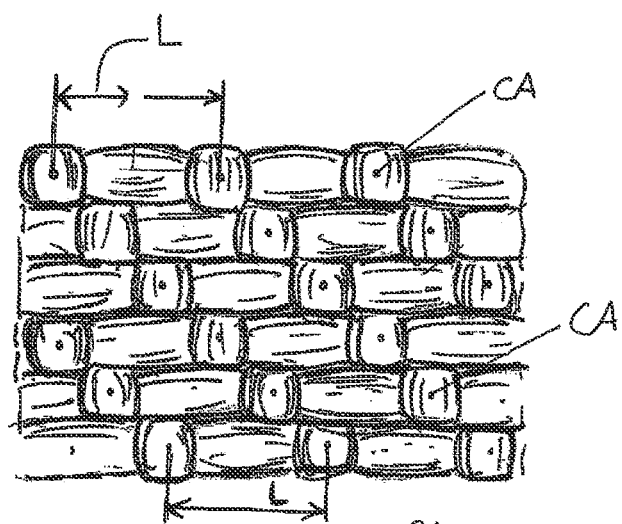
Figure 4B:
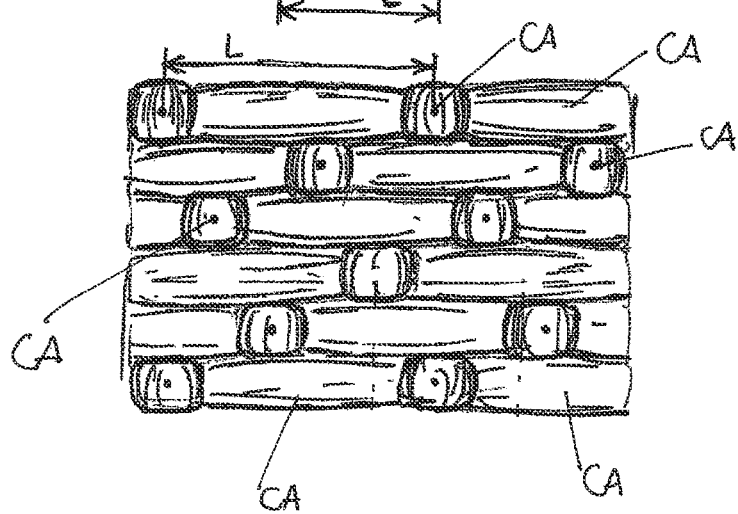
FIG. 4B is similar to FIG. 4A, but refers to a fabric having a weave of a of a satin type.

Moreover, with reference to FIG. 4A and FIG. 4B, the reduction in the number of weaves between the fibres increases the distance between adjacent areas of contact between the layer 5 and the fibres of the layer 4. In particular, the reference L in FIGS. 4A and 4B identifies the pitch between two adjacent areas of contact CA aligned along a plane of deflection, i.e., a plane orthogonal to the bending-moment vector M1 or M2.

The above length L, also referred to as weft-float length (or warp-float length, according to the arrangement of the fabric) corresponds to the extension of a local tensostructure created by the fibres of the layer 4, with the consequence that this layer, once joined to the intermediate layer 3 by means of the interface layer 5, functionally constitutes a matrix of local tensostructures.

According to the invention, the performance targets required for the panel 1 are generally achieved by adopting for the layer 4 a fabric with continuous fibres having either the weft-float length or the warp-float length, or both, greater than 1.2 mm, preferably greater than 3 mm, and even more preferably greater than 3.5 mm.

Materials and Methods—2. Interface Layer 5

Adhesion of the outer layer 4 to the intermediate layer 3 takes place through the layer 5, which can be applied in the production stage according to three modalities described by way of example hereinafter.

a) The layer 5 is obtained as solid polymeric film and is laid between the intermediate layer 3 and the layer 4 at room temperature. This is obtained by setting the various layers of the panel 1 in a mould to form the panel itself. A pressure is then applied to the mould for compacting and pressing the layers together, and the film 5 is then heated so as to bring about melting thereof—with partial penetration thereof in the fibres of the layer 4—and enable gluing of the layer 4 to the layer 3.

b) The layer 5 is obtained starting from a polymeric precursor (for example, in the form of powder or pellets, or more frequently in the form of rotating roll that can be scraped with a blade or a doctor's knife), which is melted by heating and hence spread or distributed over one of the surfaces of the two layers 3 and

4 to be glued together (or on both of them). Pressure is then applied to join the two layers 3 and 4 before the polymer solidifies.

c) The interface layer 5 is obtained as contact adhesive, which is liquid at room temperature and is (alternatively) spread, sprayed, or otherwise distributed on one of the surfaces of the two layers 3 and 4 to be glued (or on both of them); then a pressure is applied for joining the two layers 3 and 4 before the adhesive of which the layer 5 is constituted solidifies by polymerisation.

In the preferred embodiment in which the outer layer 4 is obtained as a UHMWPE fabric (preferably of the twill or satin type), the interface layer 5—as likewise the possible cladding layer 6 in the case where this is present:

has a secant elastic modulus at 10% nominal strain of less than or equal to 350 MPa to be measured according to the ASTM D882 standard, and preferably has a secant elastic modulus at 10% nominal strain of less than or equal to 150 MPa at room temperature measured according to the ASTM D882 standard; and is preferably obtained as an EVA-based mix.

In an embodiment in which the outer layer 4 is obtained as carbon-fibre fabric, the interface layer 5—as likewise the possible cladding layer 6 in the case where this is present:

has a secant elastic modulus at 10% nominal strain of less than or equal to 350 MPa measured according to the ASTM D882 standard (preferably, it has a secant elastic modulus at 10% nominal strain of less than or equal to 60 MPa measured according to the ASTM D882 standard, especially in the presence of a cladding layer 6); and is preferably obtained as a polyurethane-based mix.

In an embodiment in which the outer layer 4 is obtained as aramid-fibre fabric, the interface layer 5—as likewise the possible cladding layer 6 in the case where this is present:

has a secant elastic modulus at 10% nominal strain of less than or equal to 250 MPa measured according to the ASTM D882 standard (preferably, it has a secant elastic modulus at 10% nominal strain of less than or equal to 100 MPa measured according to the ASTM D882 standard, especially in the case of use of the layer 5 also as protective film on the outside of the layer 4); and is preferably obtained as a polyurethane-based mix.

Whatever the embodiment, the elastic modulus of the interface layer 5 is chosen in such a way as to ensure flexibility of the layer 4 also subsequent to its partial impregnation with the material of the layer 5: this constitutes a first upper limit of the value of the elastic modulus of the layer 5. Moreover, an excessively high elastic modulus of the layer 5 causes, following upon repeated cycles of bending of the panel 1, both detachment of the layer 4 from the intermediate layer 3 and failure of the fibres of the layer 4, thus determining a second upper limit of the value of the elastic modulus of the layer 5.

The relation between the two upper limits depends upon the materials of the layer 4 and of the layer 5, but in general the lower one of the two upper limits referred to above is assumed as global upper limit for the elastic modulus of the layer 5.

Preferably, the polymer used for the layer 5 is in an amount of between 20 g/m$^2$ and 200 g/m$^2$, more preferably between 30 and 100 g/m$^2$, so as to guarantee a good adhesion, in order not to render the panel 1 too heavy, and above all not to impregnate the fibres of the layer 4 excessively.

It should moreover be noted that the specifications listed above for the layer 5 identically apply to the cladding layer 6 in the case where it is present. In particular, the materials of the layer 6 are chosen according to the material of the layer 4 exactly in line with the criteria referred to above.

Materials and Methods—3. Outer Layer 2

The outer layer 2 may be obtained both using composite materials having a polymer matrix (fibre-reinforced polymers), as preferred solution, or else using sheet metal alloys, or else (this solution being less preferred but also less expensive) using high-performance polymers in the form of sheets, such as PEEK and PPS. Finally, the outer layer 2 may be obtained by layering and coupling together different laminas made of these materials, for example a steel lamina and a material having a fibre-reinforced polymer matrix.

The outer layer 2 has the function of withstanding compressive stress without undergoing significant deformation in the plane and without presenting phenomena of buckling when the panel is subjected to a bending moment that causes a deformation in the second direction of deflection, thus subjecting the fibres of the layer 4 tensile stress.

On the other hand, the outer layer 2 has, in any case, a thickness such as to enable bending thereof when the bending moment that acts upon the panel 1 is directed in the opposite direction; i.e., it causes a deformation in the first direction of deflection.

In the case of use of a metal alloy for the layer 2, a lamina is preferably used having a thickness of between 0.04 mm and 1 mm, since for larger thicknesses a high elastic modulus reduces flexibility of the material, whereas smaller thicknesses tend to produce problems of buckling and wrinkling that prevent the layer 2 from withstanding compressive loads. More preferably, the thickness is comprised between 0.05 mm and 0.5 mm.

The metal lamina is constituted by a metal with yield strength of at least 100 MPa (evaluated according to the ASTM E8/E8M standard), and preferably by steel, spring steel, titanium alloy, magnesium alloy, or some other metal alloy with high yield strength used for the production of springs, so as to prevent repeated bending of the layer 2 from producing plastic deformation, with consequent shortening of the useful service life of the panel.

In the preferential case of use of a composite material having a polymer matrix, or of a high-performance polymeric material (for example, PEEK, PPS, PMMA, epoxy resins), for the layer 2, the lower elastic modulus in bending of these materials as compared to a metal material requires a greater thickness to obtain the same effect. More specifically, this thickness is comprised between 0.1 mm and 2.5 mm, and preferably between 0.2 and 1.5 mm.

In the case of use of composite materials, for reinforcement of the layer 2 there may be used (preferably continuous) fibres of glass, carbon, UHMWPE, aramid, linen, or hemp, or other vegetal, metal, ceramic, or polymer fibres having an elastic modulus higher than 20 GPa (ASTM C1557), and a polymer matrix having an elastic modulus higher than 2 GPa (ASTM D695), for example epoxy resin.

The epoxy matrix of the first outer layer 2 is, more preferably, a modified epoxy matrix, i.e., a matrix containing additives, for example accelerators of polymerisation.

Alternatively, the layer 2 may be made of one of the following polymeric materials:

preferably polyethylene (PE), polypropylene (PP), polyphenylene sulphide (PPS), polyethylene terephthalate (PET), nylon (nylon 6, nylon 6.6), polycarbonate (PC), polyether ketone (PEEK), polymethyl methacrylate (PMMA), polyoxymethylene (POM), polystyrene (PS), polyvinyl chloride (PVC), acrylonitrile-butandiene-styrene (ABS), epoxy resins, phenol resins, or polyester resins.

In one embodiment, the outer layer 2 and the outer layer 4 are of the same thickness. In general, the thickness of the layer 4 may vary from values higher than those of the thickness of the layer 2 to values equal to or lower than those of the thickness of the layer 2 according to the properties of the fabric that constitutes it.

In general, in order to guarantee that the panel will have a flexibility suitable for practical purposes, the flexural rigidity of the layer 2 (considered in the plane configuration) must be equal to or less than 20 N/m² per metre, more preferably equal to or lower than 6 N/m² per metre;

in formulas:

$$E_{f,2} \cdot l_2 \cdot t_2^3 / 12 = EJ_{max} \cdot l_2$$

where:

$E_{f,2}$ is the flexural elasticity modulus of the layer 2, measured according to The ASTM E855 standard or the ASTM D790 standard;

$t_2$ is the thickness of the layer 2;

l is the width of the portion of the specimen of the layer 2 on which the measurement is made;

$EJ_{max}$ is the maximum flexural rigidity admissible for the outer layer 2 (equal to or less than 20 N/m² per metre, more preferably equal to or less than 6 N/m² per metre).

Moreover, in order to guarantee that the panel will have a flexural strength and a flexural rigidity suitable for practical purposes, the product of the thickness of the layer 2 and of its flexural elasticity modulus, measured according to the ASTM E855 standard or the ASTM D790 standard, must be greater than 0.4 MPa·m, more preferably greater than 0.8 MPa·m.

Materials and Methods—4. Intermediate Layer 3 The intermediate layer 3 is preferably obtained as a polymer foam or a material with cellular structure (e.g., a honeycomb structure). The intermediate layer 3 has a compressive modulus of elasticity such as to enable deformation of the panel 1 when this is subjected to deformation in the first direction of deflection (i.e., bent towards the second outer layer 4).

In particular, for an intermediate layer 3 that can be used in the panel 1 a distinction is made between:
- a macroscopic compressive modulus, which can be measured via the ASTM C365/C365M standard, which characterises the layers, measured, in foams, for a size greater than that of the pores present therein or, in materials with honeycomb structure, for a size greater than twice the size (radius) of the cells (for example, hexagonal cells); and
- a compressive modulus of the material, which characterises the material of which the walls of the pores of the foams or the walls of the cells are constituted.

In general, the macroscopic compressive modulus of the intermediate layer 3, in at least a direction parallel to the layers of the panel, referred to hereinafter, for convenience, as longitudinal direction, is preferably lower than the compressive modulus of the first outer layer 2. More specifically, the macroscopic compressive modulus of the intermediate layer 3 is at least two orders of magnitude less than the compressive modulus of the first outer layer 2 (which in this case is the compressive modulus of elasticity of a homogeneous material), more preferably at least three orders of magnitude less. This makes it possible to prevent the intermediate layer 3 from hindering bending of the panel 1 in at least a direction substantially perpendicular to the aforesaid longitudinal direction/directions in which the intermediate layer is compressible.

When the intermediate layer 3 has a cellular structure, for example a honeycomb structure (with hexagonal cells), it is preferably made of polycarbonate, meta-aramid, or other polymers.

In other embodiments, the intermediate layer 3 is a filler made of solid polymer foam, for example, a foam of polyethylene terephthalate or polyether sulphones. Other materials that may be used include polystyrene, polyurethane, polyvinyl chloride (PVC), polyolefins, urea foams, ethylenevinyl acetate (EVA), polyethylene terephthalate, or polyester or combinations thereof. Flame retardants may be added to these polymers. Auxetic foams may also be used.

In order to guarantee a low overall density of the panel 1, without jeopardising the performance thereof, it is preferable for the intermediate layer 3 to have (from the macroscopic standpoint) a density comprised between 10 and 250 kg/m³, and more preferably between 80 and 135 kg/m³. This density is commonly referred to as bulk density.

In some embodiments, the intermediate layer 3 is made of foamed material and presents a more or less deeply scored or patterned surface finish. For instance, as may be seen in FIGS. 5, 6, and 7, the intermediate layer 3 may be scored or patterned so as to create a number of ridges in the form of strips set apart from one another by gaps or slits I (with each gap I comprised between two successive ridges). The gaps I may be more (FIG. 5) or less (FIG. 6) wide according to the needs. In this way, a preferential bending direction is assigned to the material of the layer 3. The term "bending direction" is meant to indicate the direction of an axis about which there is obtained rotation of a first portion of material (in this case of the intermediate layer) with respect to an adjacent portion of material when the first portion of material is bent onto the second portion of material.

Alternatively, the material of the layer 3 may be scored or patterned so as to bestow thereon an embossed structure, for example by making the gaps I in a pair of mutually orthogonal directions using a process akin to dinking. By so doing two mutually orthogonal preferential bending directions are obtained.

Examples of foams that present such a surface finishing are commercially available and known by the names Grid-Scored, ContourKore, Scored, FlexiCut.

Preferably, the gaps I do not extend throughout the thickness of the intermediate layer, and have an orientation such that they face the layer 4. This means that the intermediate layer 3 exhibits, at the interface with the layer 2, a surface without geometrical variations, whereas it exhibits a surface interrupted by furrows (the gaps I) the layer 2.

The intermediate layer 3 with cellular structure or made of patterned foam (for example, with gaps I) is characterized by preferential directions of bending, set longitudinally with respect to the layers of the panel 1, which correspond to the directions of the sides of the hexagonal cells.

The intermediate layer 3 made of non-patterned foam is, instead, isotropic and hence without preferential directions of bending.

In an alternative embodiment, the filler is constituted by a cellulose material of vegetal origin or by wood (preferably balsa) and the macroscopic compressibility basically derives from the presence of the gaps I.

In the case of use of an intermediate layer 3 made of a material with honeycomb structure, buckling of the outer layers corresponds to the phenomenon described as "face dimpling" in the ASTM C274 standard, and the capacity of the outer layer 2 to undergo deformation is affected by the size s of the hexagonal cells; it is in fact known that, to a first approximation, the following relation applies:

$$\sigma_{b,2,x} = 2 \cdot E_{c,2,x} \cdot (t_2/s)^2$$

where:

$\sigma_{b,2,x}$ is the critical buckling stress of the first outer layer 2, in a generic direction x belonging to the two-dimensional domain that describes the surface development of the layer, preferably (in the case of fibre-reinforced material) a direction coinciding with the direction of orientation of the fibres;

$E_{c,2,x}$ is the compressive modulus of elasticity of the first outer layer 2, in the same aforesaid direction x;

$t_2$ is the thickness of the first outer layer 2; and s is the size (radius) of the hexagonal cell.

In the case of use of an intermediate layer 3 made of foam, the critical buckling load (critical compressive stress), and more precisely the load for which there occurs the phenomenon of "face wrinkling" (with reference to the ASTM C274 standard) of the outer layer 2 is affected by the compressive modulus of elasticity and by the thickness of the layer itself. Various relations are known for estimating this critical compressive stress (denoted by $\sigma_{b,2,x}$), amongst which the following:

$$\sigma_{b,2,x} = 2/3 \cdot (E_{c,2,x} \cdot E_{3,z} \cdot t_2/t_3)^{0.5}$$

where, as for the previous relation:

$t_2$ is the thickness of the first outer layer 2;

$E_{c,2,x}$ is the compressive modulus of elasticity of the first outer layer 2 as per the ASTM D3410/D3410M standard (for the layer made of fibre-reinforced polymer matrix), in the direction x along which the stress $\sigma_{b,2,x}$ is calculated;

$t_3$ is the thickness of the intermediate layer 3; and $E_{3,z}$ is the compressive modulus of elasticity of the intermediate layer 3 in a direction of the thickness as per the ASTM C365/C365M standard.

The ultimate compressive stress of the layer 2 is measured according to the ASTM D3410/D3410M standard in the case of fibre-reinforced materials, according to the ASTM D695 standard in the case of polymeric materials, and according to the ASTM E9-89A standard in the case of metal materials. By "ultimate compressive stress" is meant the compressive yield strength, in the case where this is lower than the stress that leads to failure.

The term "layer" in relation to the buckling stresses is intended to indicate the layer assembled to form the panel, and not the layer in itself prior to assembly of the panel.

The flexural properties of the panel 1 are obtained by the combined presence of the following features:

a capacity of the intermediate layer 3 to undergo compression in a direction parallel to that of the layers by virtue of its structure (characterised by pores, in the case of foams, or by the presence of cells that are empty or else full of gas, in the case of materials with honeycomb structure) and of the elastic characteristics of the material of which the layer is made; and a reduced buckling stress of the fibres and strands constituting the second outer layer 4, and of the interface layer 5 and cladding layer 6 such as to allow it to collapse locally towards the outside of the panel 1, especially where there is no adhesion between the outer layer 4 and the intermediate layer 3, and/or locally towards the intermediate layer 3 (hence towards the inside of the cells, which are typically hexagonal, or compressing the foam in a direction normal to that of its surface).

There may moreover be envisaged areas of interface between the layer 4 and the intermediate layer 3 in which there is no adhesion (which, to a certain extent, can already be obtained via the arrangement of the contact areas CA); this, for example, may be obtained using a shaped adhesive film as interface layer 5. The size of the areas not glued will correspond to the characteristic dimension at which the buckling phenomenon appears. An example is visible in FIG. 5, where the layer 5 extends only on the ridges between the gaps I.

The process of manufacture of the panel 1 forming the subject of the present invention envisages the creation of the layers of the panel by means of extruders and dies. It is possible to obtain panels that have a given shape at rest by choosing dies having a corresponding shape and/or selecting the rate of rotation of the extruders. For instance, if a semi-cylindrical die is used, the panel will maintain as resting structure the semi-cylindrical shape of the die.

After obtaining the layers of the panel, the manufacturing process envisages setting the layers on top of one another and gluing them together.

This is preferably obtained by applying a pressure that tends to compress together the layers of the panel, for example in an autoclave or using vacuum-bag technology.

Figure 8:
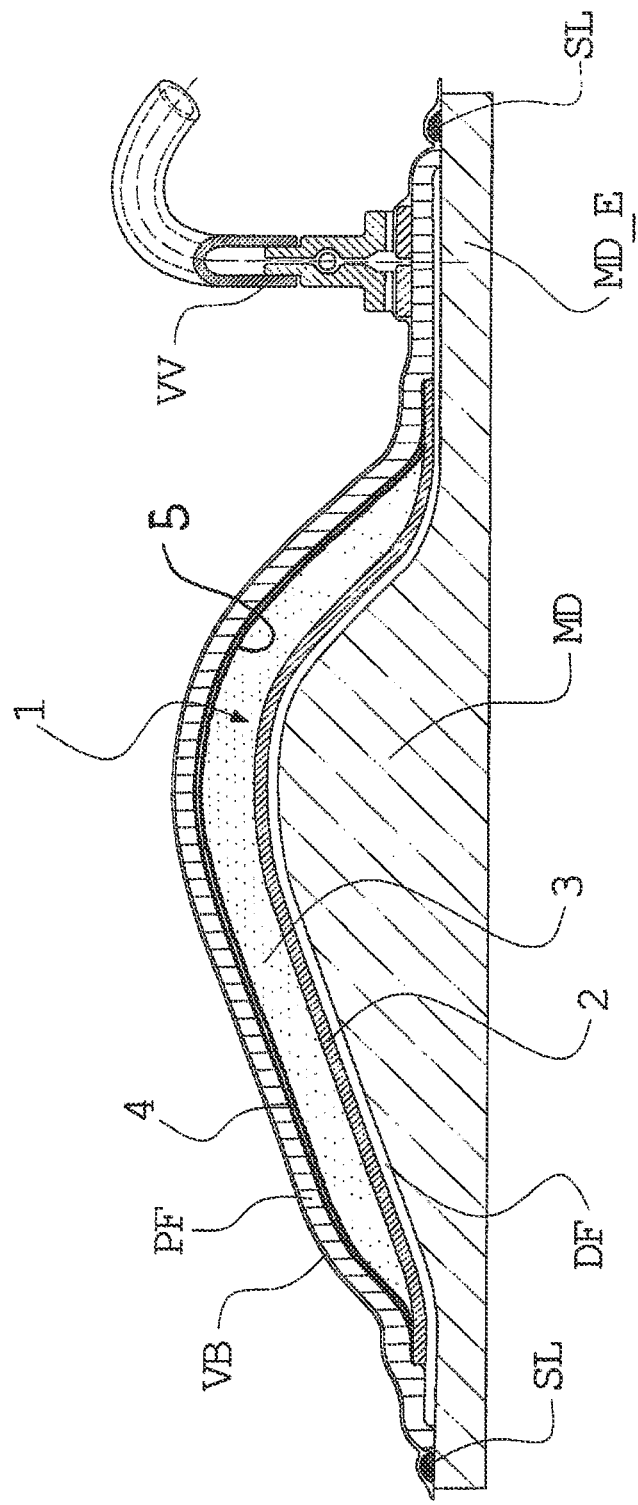
FIG. 8 is a cross-sectional view of an embodiment of the panel according to the invention during a possible production process.

Forming of the panel 1 using vacuum-bag technology is schematically illustrated in FIG. 8. In greater detail, a mould MD optionally coated with a polymeric detaching film DF (or alternatively a detaching gel) bestows on the panel (sandwich) the shape at rest (undeformed configuration).

The first outer layer 2 is laid on the detaching film DF, the filler/intermediate layer 3 is deformed so as to make it adhere to the first outer layer 2; then, the second outer layer is positioned on the intermediate layer 3, stretched out so as to obtain a surface without any creases.

Optionally, positioned on the layer 4 is a detaching film (not represented in the figure), and then a breathable fabric PF, and finally a vacuum-bag VB, which is closed on the edges of the mould MD by means of beads of adhesive SL.

By means of a valve VL for a vacuum bag connected to a vacuum pump, the gases in the chamber comprised between the mould MD and the vacuum bag VB are sucked out so that the air outside the vacuum bag VB compresses the bag itself keeping in strict contact with one another the various layers of the sandwich during the subsequent curing process.

Gluing in a low-pressure environment advantageously enables a better adhesion between the layers of the panel 1. Preferably, gluing is obtained at a temperature of between 40° C. and 200° C., more preferably 120° C. The curing time to obtain gluing is preferably comprised between 30 minutes and 6 hours, more preferably 45 minutes.

The curing process in the conditions described above determines gluing between the layers 2, 3, 4 by means of polymerisation of the polymer matrix of the layer 2 and by melting of the interface layer 5.

Preferably, the outer layers 2, 4 and the layer 5 have a surface area greater than that of the intermediate layer. In this case, the outer layers 2, 4 and the layer 5 fold back on edges of the panel (i.e., the sides of the panel in the direction of thickness) as a result of the pressure. Preferably, matrices (for the layer 2) and materials/adhesives (for the layer 5) are chosen that polymerise in the same conditions of temperature and with similar times so as to prevent any degradation of the polymers and in order to enable co-polymerisation thereof on the edges and achieve an effective adhesion of the skins (layers 2, 4) to the intermediate layer 3. Advantageously, this enables the panel to have a greater resistance to detachment between the layers.

The inventors have moreover noted how it is advisable to bend the panel 2 a first time towards the outer layer 4 (first direction of deflection) at the end of the production process so as to improve its flexibility.

Operation of the panel presented herein is described in what follows.

Figure 2:
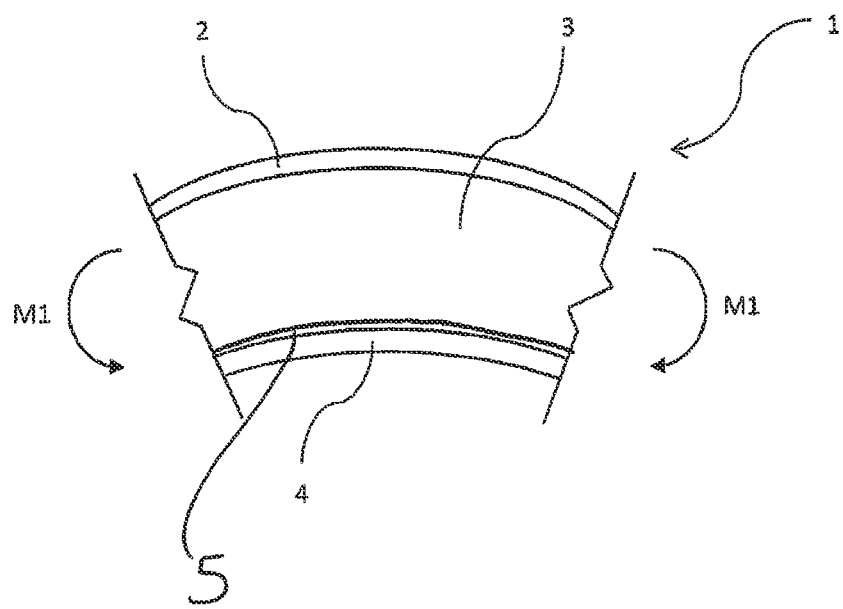
FIG. 2 illustrates the panel of FIG. 1 subjected to the action of a bending moment M1 that results in an elastica with a first direction of deflection.
Figure 9:
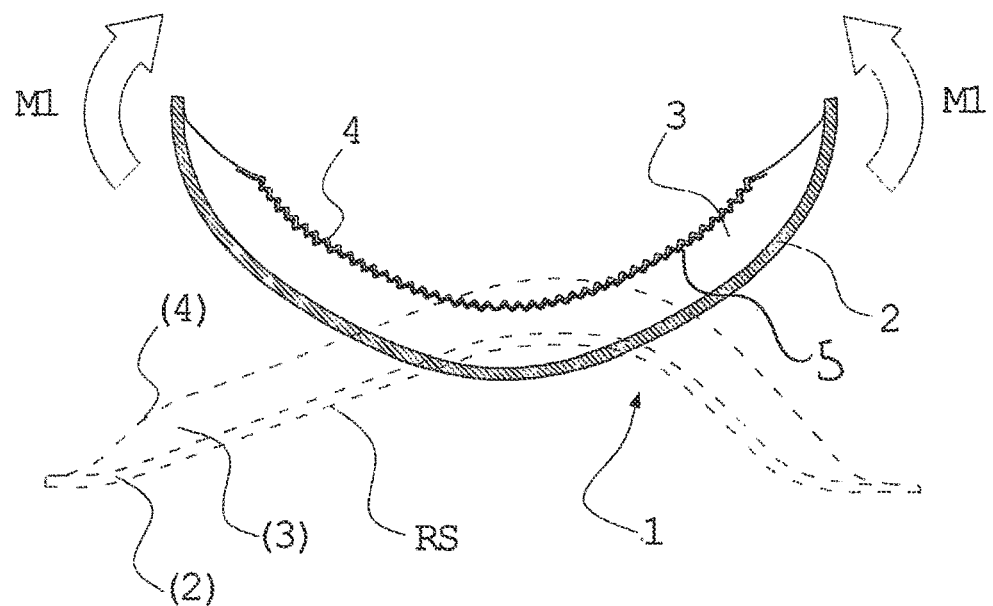
FIG. 9 illustrates the panel of FIG. 8 subsequent to forming, subjected to a first bending moment.

By applying to the panel 1 at rest a bending moment M1, as illustrated in FIGS. 2 and 9 (and, as regards the embodiments with intermediate layer 3 scored with gaps I, as in FIGS. 5B, 6B, and 7B), such as to fold the panel towards the second outer layer 4, a variation of the curvature of the panel is produced with respect to the resting situation (the shape of which is represented with a dashed line and designated by the reference RS in FIG. 9); i.e., the panel 1 bends towards the second outer layer 4.

The phrase "bending of the panel towards the second outer layer 4", as is evident from the figures, is meant to indicate a condition such that the panel 1 is deformed in a first direction of deflection by the bending moment M1, which results in application/superposition of a tensile force/tensile stress on the outer fibres of the layer 2 and of a compressive stress on the outer fibres of the layer 4.

The behaviour described above is due to the fact that the second outer layer 4 is deformable by buckling and is flexible, whereas the first outer layer 2 is flexible but substantially not extensible.

Figure 3:
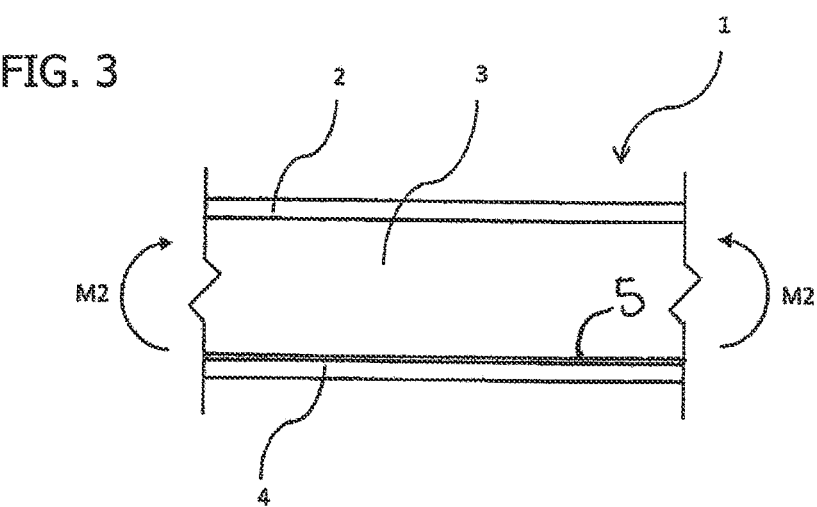
FIG. 3 illustrates the panel of FIG. 1 subjected to the action of a bending moment M2 that results in an elastica with a second direction of deflection.
Figure 10:
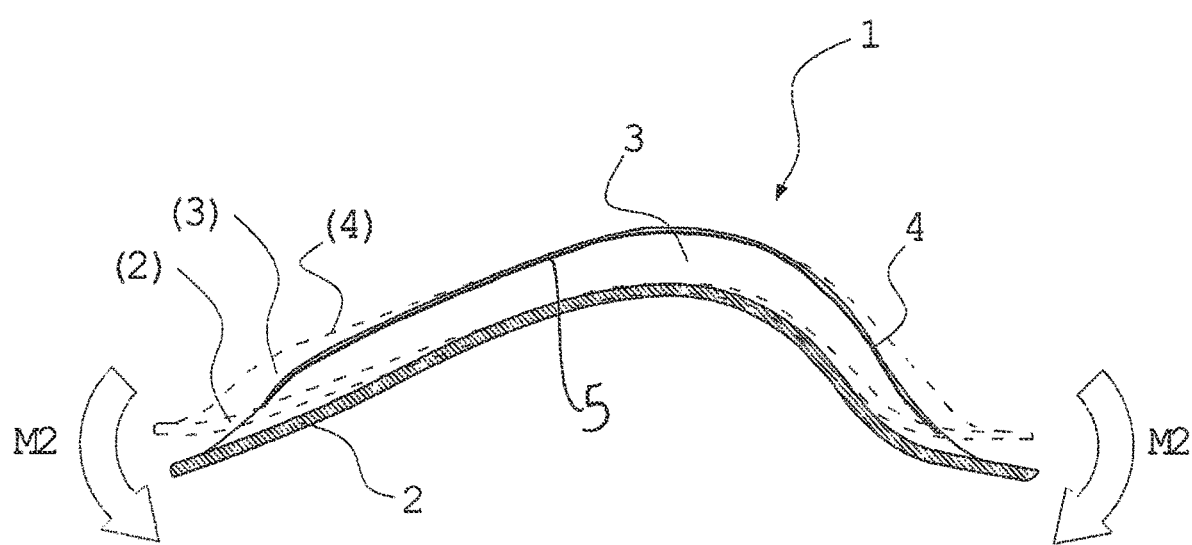
FIG. 10 illustrates the panel of FIG. 8 subsequent to forming, subjected to a bending moment opposite to the bending moment represented schematically in FIG. 6.

If, instead, a moment M2 is applied to the panel 1 (having the same intensity as M1 but with opposite direction), as illustrated in FIG. 3 and in FIG. 10, such as to bend the panel 1 towards the first outer layer 2, the panel 1 does not undergo macroscopic deformations, substantially maintaining the shape at rest (once again denoted by the reference RS in FIG. 10).

The phrase "bending of the panel towards the second outer layer 2", as is evident from the figures, is meant to indicate a condition such that the panel 1 is deformed in a second direction of deflection by the bending moment M2, which results in application/superposition of a tensile force/tensile stress on the outer fibres of the layer 4 and of a compressive stress on the outer fibres of the layer 2, in a way specular to what occurs as a result of the moment M1.

The behaviour described above is due to the fact that the first outer layer 2 withstands compression, without undergoing deformation due to buckling, and the second outer layer 4 is substantially inextensible. This behaviour is a consequence of the fact that the buckling stress of the layer 2 is higher than that of the layer 4. Thanks to this property, the layer 2 prevalently has an elastic or quasi-elastic flexural behaviour, whereas the layer 4 prevalently has the behaviour of a tensostructure: the low buckling stress determines reversible elastic instability (the so-called reversible wrinkling) when the layer 4 is subjected to compression—as in the case of the action of the moment M1—and pure (or practically pure) tensile strength when the layer 4 is subject to tensile stress—as in the case of the action of the moment M2.

Figure 9A:
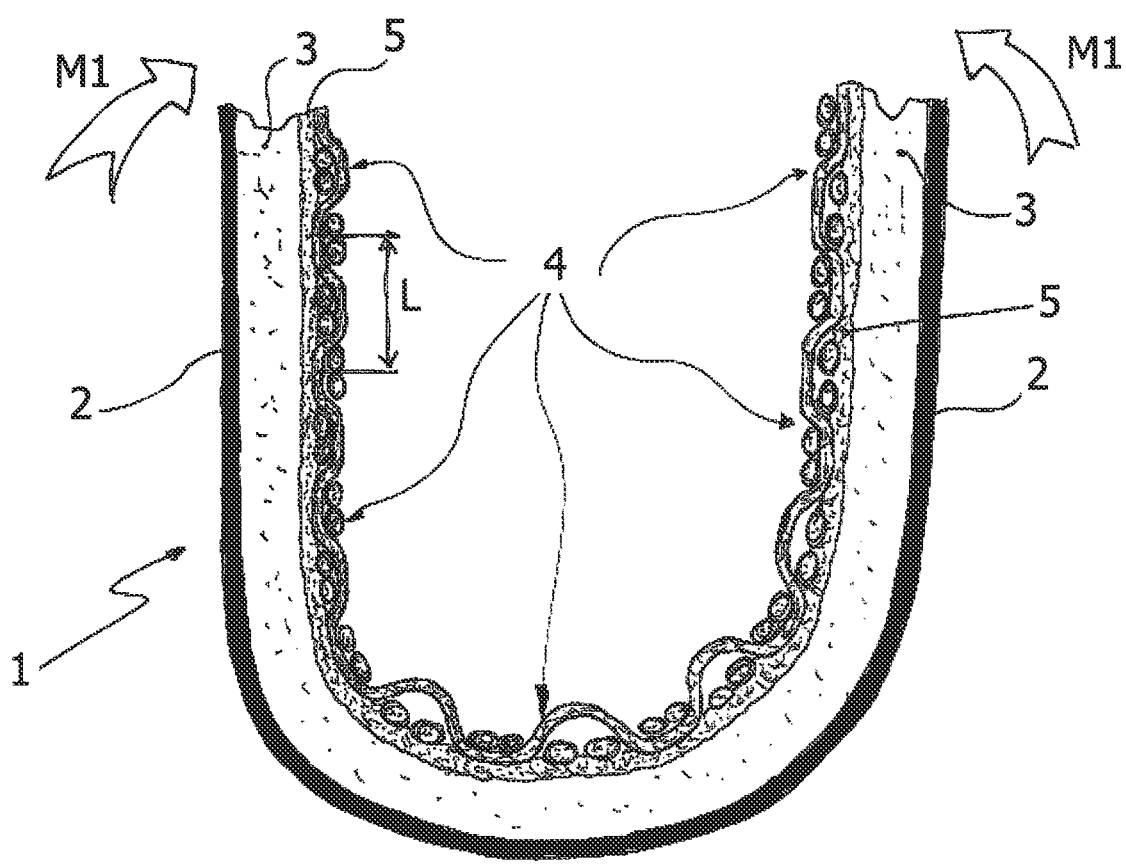
FIG. 9A illustrates a detail of the panel according to the invention when subjected to the bending moment as per FIG. 9.

Flexural deformation of the layer 2 is hence allowed in the direction of deflection associated to a compressive condition of the layer 4, since in this condition, as a result of its elastic instability, the layer 4 follows the deformation of the layer 2. This condition is visible very clearly in FIG. 9A, where it is evident how the bundles of fibres of the layer 4 not permeated by the interface layer 5 present hogging outwards and are substantially raised with respect to the intermediate layer 3 itself. To make an analogy, the fibres of the outer layer 4 in this condition behave like the stays of a suspended bridge in the case where the bridge were to be subjected to a force that tended—so to speak—to close it like a book. Not only this, but raising of the bundles of fibres of the layer 4 in this condition substantially renders the behaviour of the panel 1 to a major extent dependent upon the characteristics of the ensemble consisting of the intermediate layer 3 plus the outer layer 2.

Instead, the tensostructure-like behaviour of the layer 4 emerges at the moment of onset of a condition of tensile stress on the layer itself, which counters the flexural deformation of the layer 2 in the opposite direction of deflection. The person skilled in the branch will on the other hand appreciate the analogy with the behaviour of a true tenso-structure: the tensostructure elements counter flexural deformation of the suspended masses just one direction (in this case an obligate direction determined by the direction of the acceleration of gravity).

The tensostructure-like behaviour is on the other hand an intrinsic property of the layer 4 when this is joined to the layer 3 by means of the interface layer 5. The tensostructure matrix that results therefrom operates, by virtue of the arrangement of the contact areas CA, both in the direction of the warp and in the direction of the weft of the fabric that constitutes the layer 4. It should moreover be noted that by modulating the warp/weft ratio of the fabric constituting the layer 4, and bearing in mind of course the constraints previously referred to in this regard, it is possible to modulate the flexural properties of the layer 4.

Figure 12:
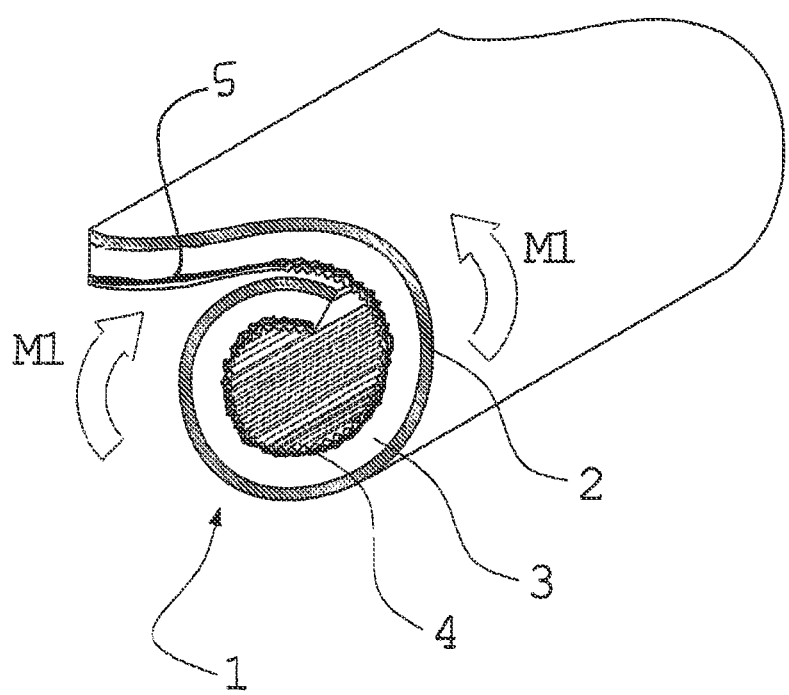
FIG. 12 illustrates the panel of FIG. 11 in a rolled-up deformed configuration.
Figure 13:
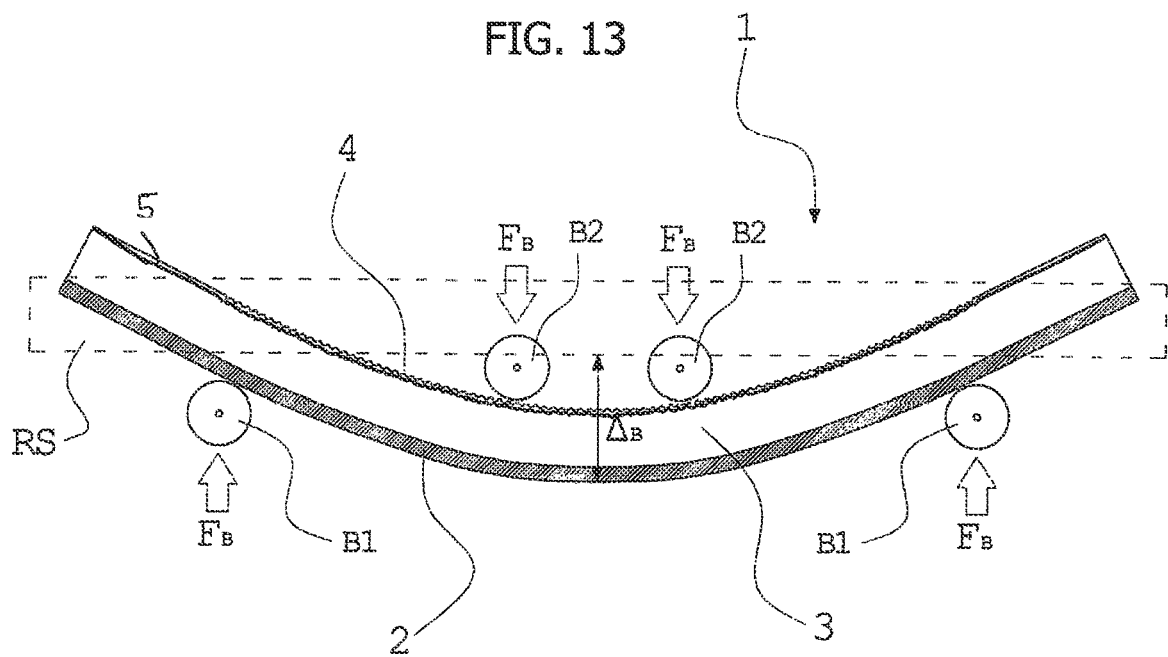
FIG. 13 and FIG. 14 illustrate two testing conditions for a panel according to an embodiment of the invention corresponding to Example 2.
Figure 14:
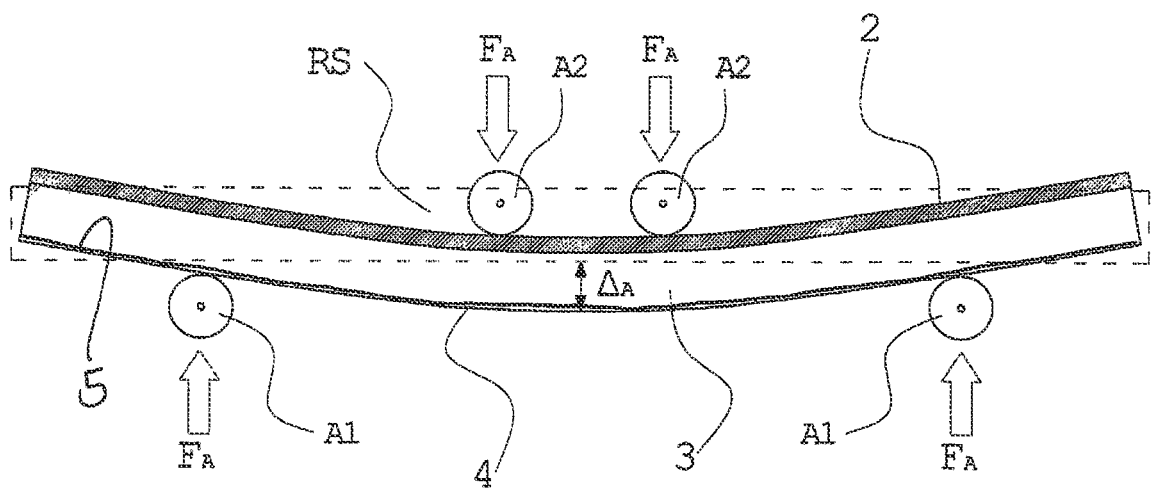

In yet other words, it is possible to state that in the panel/sandwich 1, in a direction of deflection that determines a compression of the outer fibres of the outer layer 2, the latter will be supported by means of a tensostructure constituted by the fibres of the fabric of which the layer 4 is made, which markedly limits, or even prevents, flexural deformation thereof. In the opposite direction of deflection, flexural deformation of the layer 2 may be considerable, even enabling (FIG. 12) rolling-up of the panel 1 with the layer 4 completely wrinkled.

Not only this, but if in the case of deformation in the first direction of deflection a part of the bundles of fibres of the layer 4 are substantially "deactivated" given that they are raised with respect to the intermediate layer, when a moment M2 is exerted on the panel 2 that tends to cause deformation in the second direction of deflection, the bundles of fibres previously "deactivated" are "reactivated" and withstand the tensile stresses jointly with the portions of layer 4 directly permeated by the layer 5. This means, in the ultimate analysis, that there exists an asymmetry not only at the level of flexural rigidity, but also—and above all—at the level of density of (tenso)structure elements that intervene in the layer 4.

This asymmetry of flexural rigidity is hence obtained by virtue of the choice of the layers of the panel (and hence according to the technical characteristics described above, such as elastic moduli, buckling stresses, macroscopic compressive moduli, etc.), which make it possible for the flexural rigidity of the panel, when this is subjected to a moment M1, to be, preferably, more than one order of magnitude less than the rigidity of the same panel if this is subjected to a moment M2 (of equal intensity as the moment M1). More preferably, the rigidity linked to the moment M1 is at least two orders of magnitude less than the rigidity linked to the moment M2.

Bending of the panel on the second outer layer 2 is moreover obtained in preferential directions of bending given by the structure of the panel 1.

Further preferential directions of bending are also determined by the orientation of the fibres of the fabric of the layer 4 and of the fibres that reinforce the matrix of the layer 2 (if this is made of fibre-reinforced material). For instance, if the aforesaid outer layers comprise a greater portion of fibres arranged in one and the same direction, the panel 1 offers a lower resistance to bending in a direction parallel to those fibres.

The flexural properties of the panel forming the subject of the present invention may prove particularly useful in the aerodynamic and fluid-dynamic fields. The panel is, in fact, able to vary its shape under the action of external forces, and this may advantageously produce a reduction of the action exerted by these forces on the panel itself, thus preventing stresses that otherwise might induced failure in the panel. This behaviour may, for example, arise in the case where the panel is subjected to the action of a strong wind, such as to induce the panel to bend. As a result of bending, the surface of the panel exposed to the wind, and hence the action thereof on the panel, is reduced.

The panel forming the subject of the present invention may find application in multiple technical sectors, some of which are pointed out hereinafter purely by way of example.

The panel may be used in the aeronautics field in the case where it is necessary to have a flexible material that will enable change of aerodynamic conformation. In these cases, it is possible, for example, to envisage that the panel can be bent by applying appropriate forces using tie-rods, ropes, pistons, or other mechanisms.

In the field of the safety clothing, for example in motor-cycling, the panel can be used for creating joins that are able to resist impact or sliding friction. In addition, the panel can serve to limit any possible movements that might dislodge or damage the joints or tendons of users who wear such clothing.

The panel may also be used in the field of design for interiors or camping equipment, for creating objects and convertible or foldable furnishings characterised by considerable lightness, for example foldable seats or chairs.

The panel may also be used in the medical field and in the field of rehabilitation in the case where a very light, resistant material is needed that is flexible in just one direction. For instance, the panel may be used to obtain braces for rehabilitation of knees and arms in order to limit rotation of the joints. Moreover, the panel 1 may be used for producing the seat of a foldable wheelchair that will be able to combine the characteristics of transportability of foldable wheelchairs with comfort, stability, and long service life of a non-foldable wheelchair.

A further use of the panel is possible in the nautical field as well as in the sports sector, for the production of sails, kites, foldable hulls, watercraft, and their components, which require optimal performance in terms of tensile strength and lightness; moreover, in the sector of winter sports, the panel may be used for the production of foldable and light equipment (for example, bobsleighs and sleighs in general, etc.). In the sports sector strictly speaking, it is possible to use the panel 1 to obtain reinforcement spines for ultra-light goalkeeper gloves, which enable a movement of bending in just one direction, resisting bending in the opposite direction beyond a pre-set limit.

Finally, in the building sector, the panel may be used to create emergency structures or structures for forming concrete castings.

It is moreover possible to form flexible joints between elements and rigid composite panels, which make it possible to maintain the continuity of the material or obtain water-tight joints, and guarantee optimal distribution of the stresses also in the joining area.

Of course, the details of construction and the embodiments may vary widely with respect to what has been described and illustrated herein, without thereby departing from the sphere of protection of the present invention, as defined by the annexed claims.

The invention claimed is:

1. A panel (1) having a layered structure comprising:
   a first outer layer (2);
   an intermediate layer (3);
   a second outer layer (4); and
   an interface layer (5) between said intermediate layer (3) and said second outer layer (4), said interface layer (5) enabling adhesion of the intermediate and second outer layers (3, 4) it is arranged between;
   wherein a fabric proper free of any matrix is used to form the second outer layer (4), the second outer layer having continuous fibres and having a tensile modulus of elasticity higher than or equal to 40 GPa as measured according to ASTM 01557 standard, and wherein a majority of the second outer layer remains the fabric proper free of any matrix after being joined to the intermediate layer;
   wherein said first outer layer (2) is made of sheet material having a flexural elasticity modulus higher than 2 GPa measured in accordance with ASTM E855 or ASTM D790 standards;
   wherein a product of a thickness of said first outer layer (2) and the flexural elasticity modulus of said first outer layer (2), measured in accordance with ASTM E855 or ASTM D790 standards, is higher than 0.4 Mpa·m;
   wherein the intermediate layer is made of a material chosen from the group consisting of:
   materials having a honeycomb structure, and
   polymer foams;
   wherein the intermediate layer has a macroscopic compressive modulus of elasticity measured with ASTM C365/C365M standard, the macroscopic compressive modulus of elasticity being measured, in a polymer foam intermediate layer, for a size greater than that of pores present in the polymer foam or, in materials with honeycomb structure. for a size greater than twice a size of a radius of cells of the honeycomb structure:
   wherein the macroscopic compressive modulus of the intermediate layer, in at least a direction parallel to the layers of the panel, is at least two orders of magnitude lower than a compressive modulus of elasticity of the first outer layer such that the intermediate layer is prevented from hindering bending of the panel in at least a direction substantially perpendicular to said direction parallel to the layers of the panel in which the intermediate layer is compressible, and wherein the compressive modulus of elasticity of the first outer layer is measured according to ASTM D3410/D3410M standard;
   wherein flexural properties of the panel are obtained by a combination of:
   the intermediate layer being configured to undergo compression, in a longitudinal direction parallel to that of the layers of the panel, and
   a reduced buckling stress of the fibres and strands constituting the second outer layer and the interface layer relative to the first outer layer. such as to allow the second outer layer to collapse locally towards an outside of the panel, and/or locally towards the intermediate layer;
   wherein when applying to the pan& at rest, a first bending moment configured to fold the panel towards the second outer layer, a variation of a curvature of the panel is produced with respect to a resting situation, with the panel bending towards the second outer layer, with the second outer layer being deformable by buckling and flexible, and the first outer layer being flexible. but substantially non-extensible, and wherein when applying a second bending moment to the panel with an opposite direction to the first bending moment and a same intensity as the first bending moment thereby urging the panel to bend towards the first outer layer, the panel does not undergo macroscopic deformations, substantially maintaining the panel's shape at rest, with the first outer layer withstanding compression without undergoing deformation due to buckling, and the second outer layer being substantially inextensible via the reduced buckling stress of the second outer layer relative to the first outer layer.

2. The panel (1) according to claim 1, wherein a thickness of said first outer layer (2) is comprised between 0.04 mm and 2.5 mm.

3. The panel (1) according to claim 1, wherein said interface layer (5) has a secant elasticity modulus at 10% nominal strain lower than or equal to 350 Mpa measured in accordance with ASTM D882 standard.

4. The panel (1) according to claim 1, further including an outer cladding layer (6) of said second outer layer (4), said outer cladding layer (6) being arranged on an opposite side of said second outer layer (4) relative to said interface layer (5).

5. The panel according to claim 1, wherein said interface layer (5) is made as solid polymer film, said interface layer (5) being fusible to obtain a partial penetration thereof into the continuous fibres of the second outer layer (4), thereby joining the second outer layer (4) to the intermediate layer (3).

6. The panel according to claim 1, wherein said interface layer (5) is made from a polymer precursor, which is fusible and subsequently spreadable over at least one of surfaces of said intermediate layer (3) and said second outer layer (4) to be joined together.

7. The panel according to claim 1, wherein said interface layer (5) is made from a contact adhesive, said contact adhesive being liquid at room temperature.

8. The panel (1) according to claim 1, wherein said first outer layer (2) has a greater thickness than said second outer layer (4).

9. The panel (1) according to claim 1, wherein said first outer layer (2) has a thickness which is lower than or equal to a thickness of said second outer layer (4).

10. The panel (1) according to claim 1, wherein said fabric with continuous fibres comprises a textile weave of a twill type or of a satin type having a warp-float length or a weft-float length (L) greater than 1.2 mm.

11. The panel (1) according to claim 1, wherein said first outer layer (2) comprises a carbon-fibre-reinforced composite material.

12. The panel (1) according to claim 1, wherein said interface layer (5) is made of ethyl-vinyl-acetate (EVA).

13. The panel (1) according to claim 1, wherein the continuous fibres of said second outer layer (4) are made of high-density ultra-high-molecular-weight polyethylene (UHMWPE).

14. The panel (1) according to claim 1, wherein the intermediate layer (3) is made of materials having a honeycomb structure.

* * * * *